G. B. SCHLEY.
TIME ELEMENT DEVICE.
APPLICATION FILED JULY 28, 1911.
1,027,440.
Patented May 28, 1912.
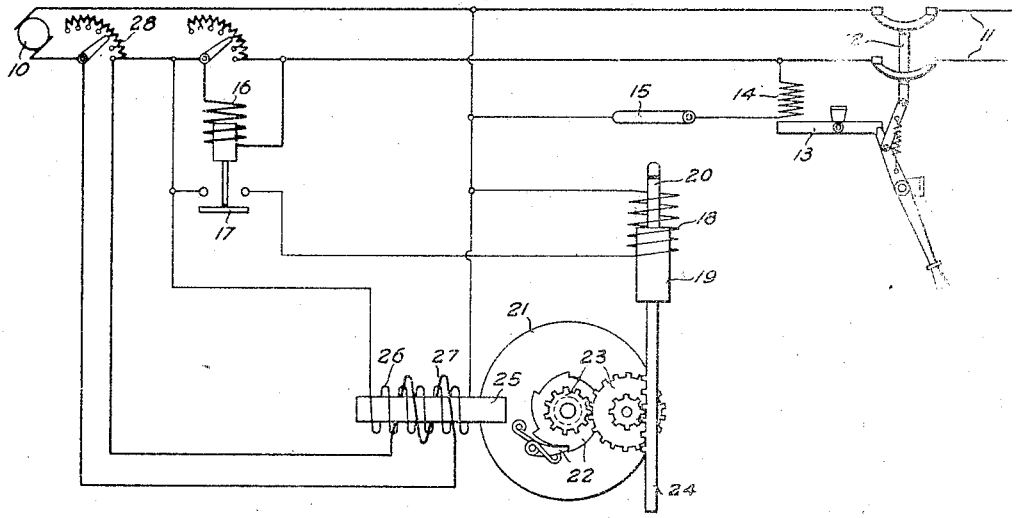
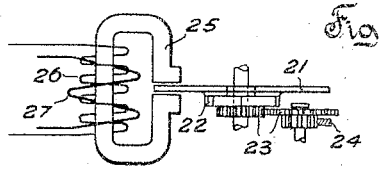
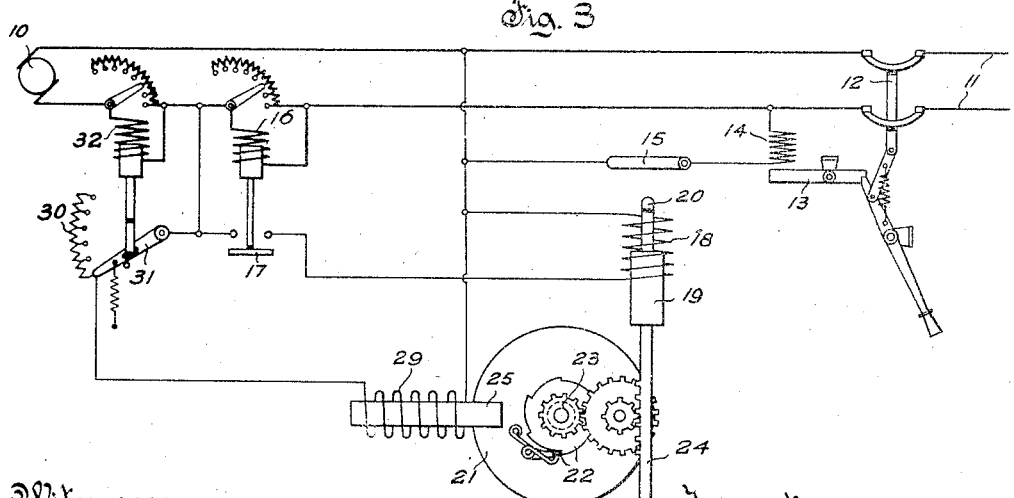
Witnesses
Rob. E. Stoll
Chas. L. Byron
Inventor
George B. Schley
By Chas. E. Lord
Attorney

UNITED STATES PATENT OFFICE.

GEORGE B. SCHLEY, OF MILWAUKEE, WISCONSIN, ASSIGNOR TO ALLIS-CHALMERS COMPANY, A CORPORATION OF NEW JERSEY.

TIME-ELEMENT DEVICE.

1,027,440.   Specification of Letters Patent.   Patented May 28, 1912.

Application filed July 28, 1911. Serial No. 641,144.

*To all whom it may concern:*

Be it known that I, GEORGE B. SCHLEY, a citizen of the United States, residing at Milwaukee, in the county of Milwaukee and State of Wisconsin, have invented certain new and useful Improvements in Time-Element Devices, of which the following is a full, clear, and exact specification.

My invention relates to time element devices.

It is frequently desirable that upon the occurrence of an overload or other abnormal condition in a circuit to be protected the circuit be broken after a predetermined time after the rise of such condition, and that such predetermined time be an inverse function of the extent of such abnormality.

It is the object of my present invention to provide a device for obtaining such an inverse time element.

In carrying out my invention there is provided a metal disk mounted for rotation between the poles of a magnet the flux of which is an inverse function of the abnormality of the condition in the circuit to be protected. The usual abnormal condition to be protected against is an overload, in which case the flux of such magnet is varied in inverse sense to the current in the circuit to be protected. The disk is mechanically connected in any suitable manner to the device the movement of which it is desired to retard.

The various novel features of my invention will appear from the description and drawings, and will be particularly pointed out in the claims.

Figure 1 shows diagrammatically a system embodying my invention; Fig. 2 is a plan view of the inverse time element device; and, Fig. 3 shows diagrammatically a modification.

The device to be protected is shown as a generator 10, which is connected to a circuit 11 through a circuit-breaker 12. This circuit-breaker is biased to open position, but in the arrangement shown is normally held in closed position by a latch 13 controlled by a holding coil 14. The coil 14 is connected as a no-voltage coil. In the circuit of the coil 14 is a switch 15, which may be opened by hand or automatically. The automatic opening of the switch occurs whenever, because of a predetermined overload on the generator 10, the overload coil 16 closes the switch 17 to cause the energization of the coil 18 and the latter raises its core 19 so that the projection 20 thereof strikes against and opens the switch 15. The upward movement of the core 19, however, is retarded by my time element device.

This time element device comprises a metal disk 21 which is connected through a ratchet 22 and suitable gearing 23 to a rack 24 on a downward projection of the core 19. The ratchet 22 is so arranged that when the core 19 is raised the disk 21 is rotated thereby, but when the core 19 drops the disk is not rotated. The disk 21 projects between the poles of a magnet 25, which induces eddy-currents in such disk when the latter is rotated and thereby tends to prevent such rotation. The flux produced by the magnet 25 is an inverse function of the current supplied to the generator 10. This relationship between the flux of the magnet 25 and the current supplied to the generator 10 may be obtained in different ways, two of which are illustrated in Figs. 1 and 3 respectively.

In the arrangement shown in Fig. 1, the magnet 25 has an energizing coil 26 which is connected across the circuit 11, assumed to be of substantially constant voltage. In consequence, this coil 26 is of substantially constant strength. The coil 26 may be dispensed with entirely by making the magnet 25 a permanent magnet. The magnet 25 also has a demagnetizing coil 27, which opposes the coil 26 or the permanent magnetism of the magnet 25. The coil 27 is connected to carry a current proportional to that supplied by the generator 10, this result being obtained in the arrangement illustrated by connecting it in shunt to a variable resistance 28 in the circuit supplied by such generator.

Upon the occurrence of an overload, the solenoid 16 closes the switch 17 to cause the energization of the solenoid 18, and the latter begins to raise the core 19. The upward movement of the core 19 is retarded, however, by the rotation of the disk 21 between the poles of the magnet 25, the amount of the retardation depending upon the value of the flux of such magnet. Since the demagnetization produced by the coil 27 is a direct function of the current supplied by the generator 10, such flux, and therefore such retardation, is an inverse function of such current. In consequence, the time required for the coil 18 to lift its core 19 sufficiently for the projection 20 to open the switch 15 is an inverse function of the overload on the generator 10. Upon such opening of the switch 15, the coil 14 releases the latch 13 and the circuit-breaker 12 opens automatically. The teeth on the rack 24 are preferably cut away at the lower part of such rack, so that the last part of the upward movement of the core 19 may be rapid and the projection 20 may open the switch 15 quickly.

In the arrangement shown in Fig. 3, the magnet 25 has but one coil, an energizing coil 29. In the circuit of this coil 29 is a variable resistance 30, the controlling arm 31 of which is operated by a coil 32 connected to carry current proportional to that supplied to the generator 10. This resistance 30 is normally all cut out, as illustrated. When the current supplied to the generator 10 reaches a predetermined value, the solenoid 16 closes the switch 17 to energize the solenoid 18 and the latter begins to raise its core 19 as in the arrangement shown in Fig. 1. Here also the upward movement of the core 19 is retarded by the rotation of the disk 21 between the poles of the magnet 25. If the current supplied to the generator 10 rises beyond the value necessary for the closing of the switch 17, the solenoid 32 raises the arm 31 to cut part or all of the resistance 30 into the circuit of the coil 29. The amount of resistance thus cut in the circuit of the coil 29 is a direct function of the current supplied by the generator 10. The cutting in of the resistance 30 weakens the magnet 25 and decreases the retarding effect on the upward movement of the core 19; so that here also the time required after the closing of the switch 17 for the opening of the switch 15 and the consequent tripping of the circuit-breaker 12 is an inverse function of the overload on the generator 10.

Many modifications may be made in the arrangements shown and described, and I aim to cover all such modifications which do not involve a departure from the spirit and scope of my invention as set forth in the following claims.

What I claim as new is:

1. In combination, a device to be protected, means for protecting such device upon the occurrence of an abnormal condition, and a time element device for retarding the operation of said protective device, said time element device comprising a metal member, a magnet for producing eddy currents in such member upon relative rotation between the member and magnet, and means for causing the flux of such magnet to be an inverse function of the extent of such abnormal condition.

2. In combination, a circuit to be protected, a circuit-breaker in such circuit, and a time element device controlling the operation of such circuit-breaker, said time element device comprising a metal member, a magnet between the poles of which such member rotates, and means for causing the flux produced by such magnet to vary in inverse sense to the current in such circuit.

3. In combination, an electric circuit, and a time element device controlling such circuit, said time element device comprising a metal disk, a magnet which induces eddy currents in said disk upon the rotation of the latter, and means for causing the flux produced by such magnet to be an inverse function of the current in such circuit.

4. In combination, an electric circuit, and a time element device controlling such circuit, said time element device comprising a rotatable metal disk, and an electromagnet the flux of which is an inverse function of the current in such circuit and induces eddy currents in said disk upon the rotation thereof.

5. In combination, an electric circuit, and a time element device controlling said circuit, said time element device comprising a rotatable metal disk, a magnet which induces eddy currents in said disk upon the rotation thereof, and a coil which carries current proportional to that in said circuit and tends to cause the deënergization of such magnet.

Milwaukee, Wis., July 22, 1911.

In testimony whereof I affix my signature, in the presence of two witnesses.

GEORGE B. SCHLEY.

Witnesses:
 CHAS. L. BYRON,
 ROB. E. STOLL.